US010423699B1

(12) United States Patent
Sartor

(10) Patent No.: US 10,423,699 B1
(45) Date of Patent: Sep. 24, 2019

(54) DISPLAYING THE POSITION OF A MESSAGE WITHIN A CONVERSATION

(71) Applicant: Amazon Technologies, Inc., Seattle, WA (US)

(72) Inventor: Markus Petrus Giuseppe Sartor, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 14/976,195

(22) Filed: Dec. 21, 2015

(51) Int. Cl.
*G06F 17/00* (2019.01)
*G06F 17/21* (2006.01)
*H04L 12/58* (2006.01)
*G06F 3/0485* (2013.01)

(52) U.S. Cl.
CPC ........ *G06F 17/212* (2013.01); *G06F 3/04855* (2013.01); *H04L 51/22* (2013.01)

(58) Field of Classification Search
CPC ....... H04L 51/066; H04L 51/04; H04L 51/22; G06F 17/212; G06F 3/04855; G06F 3/0482; G06F 3/0485; G06F 3/167; G06F 3/04847; G06F 3/04842; H04M 1/72552
USPC ......................................................... 715/277
See application file for complete search history.

(56) References Cited

U.S. PATENT DOCUMENTS

| 5,510,808 | A * | 4/1996 | Cina, Jr. | G06F 3/04855 |
| | | | | 345/684 |
| 6,557,027 | B1 * | 4/2003 | Cragun | H04L 12/1813 |
| | | | | 709/204 |
| 2003/0043207 | A1 * | 3/2003 | Duarte | G06F 3/0485 |
| | | | | 715/810 |
| 2005/0132012 | A1 * | 6/2005 | Muller | H04L 51/066 |
| | | | | 709/206 |
| 2008/0171535 | A1 * | 7/2008 | Carmody | H04M 1/72552 |
| | | | | 455/412.2 |
| 2008/0180408 | A1 * | 7/2008 | Forstall | G06F 3/0482 |
| | | | | 345/177 |
| 2009/0187855 | A1 * | 7/2009 | Gruen | G06F 3/0481 |
| | | | | 715/808 |
| 2009/0319617 | A1 * | 12/2009 | Bhakar | G06Q 10/107 |
| | | | | 709/206 |
| 2010/0107066 | A1 * | 4/2010 | Hiitola | G06F 3/0485 |
| | | | | 715/702 |
| 2012/0238328 | A1 * | 9/2012 | Zhang | H04M 1/72552 |
| | | | | 455/566 |

(Continued)

*Primary Examiner* — Jason T Edwards
(74) *Attorney, Agent, or Firm* — Lee & Hayes, P.C.

(57) ABSTRACT

Functionality is disclosed for providing and displaying an indication as to a position within a message that is currently being displayed within a message conversation that includes multiple messages. A personal information management (PIM) client application or another type of messaging application receives the messages in the conversation. The conversation is parsed, by either the PIM client application or a PIM server application that forwarded the messages in the conversation to the PIM client application, in order to determine sizes and beginnings of the multiple messages. As a message is displayed within the conversation, a message position indicator is displayed that indicates the position within the message relative to the size of the message. The position represents the portion of the message that is currently being displayed. The message position indicator resets when the beginning of a new message is displayed.

20 Claims, 8 Drawing Sheets

(56) References Cited

U.S. PATENT DOCUMENTS

| | | | |
|---|---|---|---|
| 2012/0290662 A1* | 11/2012 | Weber | G06N 99/005 709/206 |
| 2012/0324021 A1* | 12/2012 | Cao | H04L 51/30 709/206 |
| 2013/0239008 A1* | 9/2013 | Curtis | G06Q 10/00 715/738 |
| 2014/0201677 A1* | 7/2014 | Jin | G06F 3/04855 715/787 |
| 2014/0298211 A1* | 10/2014 | Mehta | G06Q 30/02 715/760 |
| 2014/0365886 A1* | 12/2014 | Koenig | G06F 3/04855 715/711 |
| 2014/0372930 A1* | 12/2014 | Li | G06F 3/0482 715/772 |
| 2015/0177977 A1* | 6/2015 | Amacker | G06F 3/014 715/787 |
| 2016/0041736 A1* | 2/2016 | Schulz | G06F 3/04855 715/772 |
| 2016/0170580 A1* | 6/2016 | Cho | G11B 27/105 715/716 |

* cited by examiner

US 10,423,699 B1

DISPLAYING THE POSITION OF A MESSAGE WITHIN A CONVERSATION

BACKGROUND

Electronic mail ("email") has become a ubiquitous way of modern communication. As a result, users often can end up entering into "email conversations" that are generally an email message thread or chain made up of multiple individual email messages. Such email conversations generally involve an initial email message sent by a first party to one or more recipients. Often, one or more of the recipients will reply to the initial message and then the first party and/or one or more of the recipients will further reply and so on. Thus, such email conversations can be long and include numerous messages.

Often, messages within an email conversation are long, i.e. the message is a large piece of text. Generally, a vertical scrollbar indicator provides an indication as to where within the email conversation a recipient is currently reading relative to the size of the email conversation. However, there is no way of knowing how far a recipient is in reading a large piece of text within the email conversation other than scrolling down to check how large the piece of text is so that the user can determine how far they are in reading the text. In scrolling down though, the user might lose their position in the text, which is needed in order to resume reading the large piece of text. This generally results in a search for the position in the text to allow the user to resume reading, which is generally inefficient for the user.

The disclosure made herein is presented with respect to these and other considerations.

DETAILED DESCRIPTION

Figure 1:
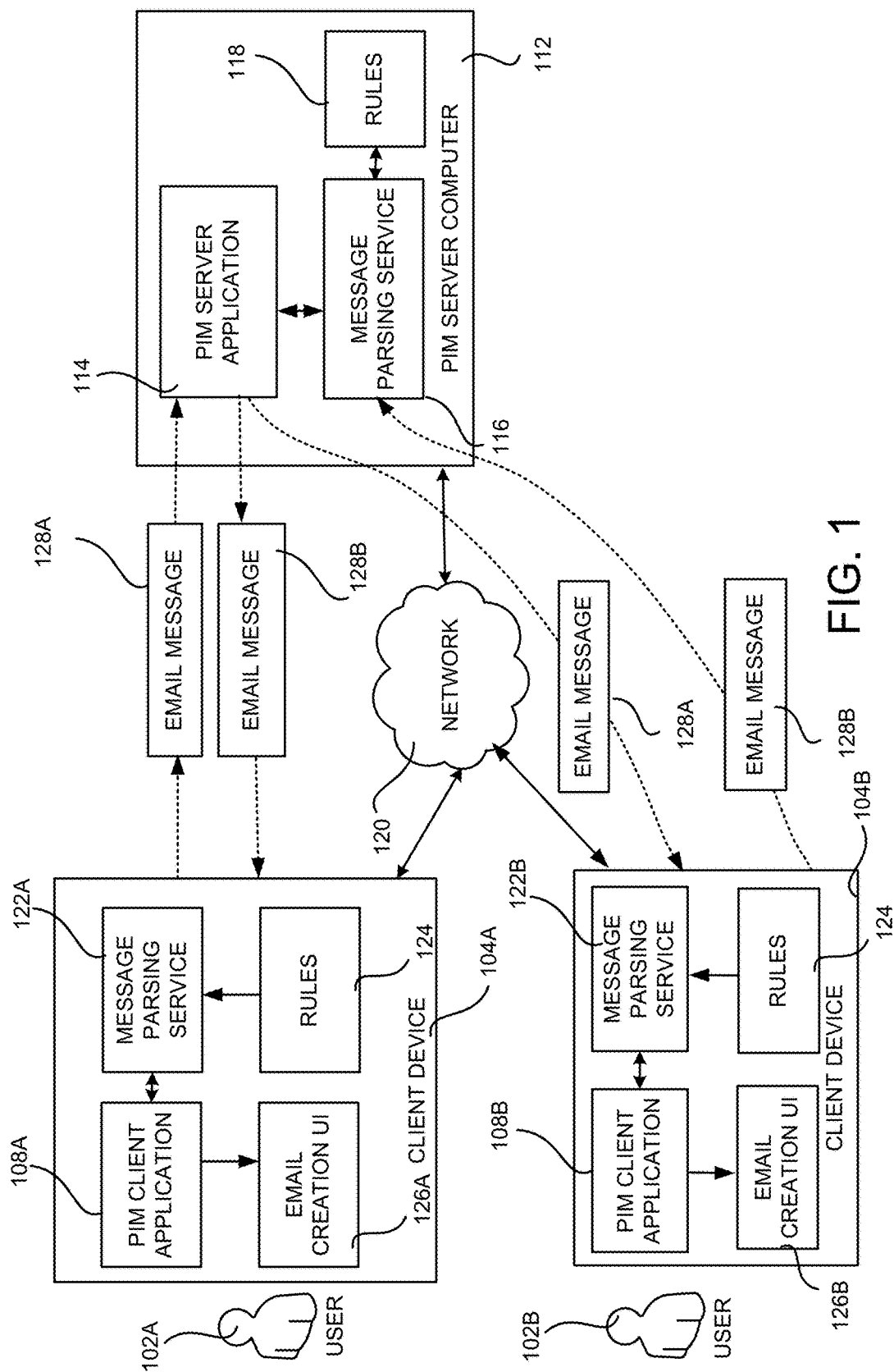
FIG. 1 is a computer system architecture diagram showing aspects of the configuration and operation of several components described herein for providing an email message position indicator for messages within a message conversation, according to one configuration.

The following detailed description is directed to technologies for analyzing messages in a conversation, such as an email thread having multiple email messages, and displaying an indication as to a position within a message that is currently being displayed within the conversation. Utilizing the technologies described herein, a user of a personal information management ("PIM") client application, or another type of messaging application, can be provided with an indication as to a position within an email message, or another type of message, that is currently being displayed within the conversation, i.e. read by the user, without requiring the user to scroll down to the end of the message in order to determine the position within the message that the user is currently reading.

For example, and without limitation, in one particular configuration the technologies disclosed herein can be utilized with messages, e.g., email messages, handled by a PIM system. In particular, a PIM server application executes on a PIM server computer, and transmits messages to a PIM client application running on a client device that includes a display. The PIM client application can be configured to display messages on the display to a user of the client device. The PIM server computer can also receive multiple messages for the user of the client device from, for example, other users of the PIM system or from users of a different PIM system.

As is known, messages, especially email messages, can be quite lengthy. In conversations that include multiple messages, i.e. an original message and one or more message replies, one or more of the multiple messages may include a large amount of text. Thus, in an example, a message position indicator different from the scroll bar indicator for the overall conversation is provided. The message position indicator is a graphical user interface ("GUI") object that indicates a position within a message of the conversation that is being displayed at the client device. The position is based upon the overall size of the message being displayed.

In an example, the message position indicator is a scrollbar that is horizontal and aligned with a top portion of a window or other window of a display in which the conversation is being displayed. As the message moves within the display, i.e. scrolls in a vertical direction, the message position indicator changes. For example, when approximately 25% of the message being displayed has been displayed, then the message scroll bar will have a length of approximately 25%. When the message is approximately at the halfway point, then the scroll bar is lengthened to be approximately half the total length. In an example, the determination as to how much of the message has been displayed is based upon what portion of the message is being displayed in the middle of the window or other area of the display of the client device displaying the conversation.

As an example, the message scroll bar can be replaced with or include a percentage indicator. Additionally, the message scroll bar can be located along a vertical side of the message being displayed. In other examples, the color or shade of the message scroll bar can change as the position of the message changes. In addition, the color and/or shade of the background of the display may also change as the position of the message changes.

In order to determine the position of the message being displayed from within the conversation, the conversation needs to be parsed in order to indicate a beginning and an end for each message within the conversation. The parsing can be done at the PIM server or on the client device itself. The parsing can take into account the various headers that generally begin each message within the conversation. For example, the field that indicates the message sender and/or the message recipient can be used.

Additionally, messages often include an indication as to the beginning of the message with a heading, such as, for example, "—Original Message—" or the like. Thus, such a heading can be used to indicate the beginning of a message within a conversation. In other examples, the parsing can also include adding markers within the message to indicate the beginning and/or the end of the messages. Carriage returns within the messages can also be used.

In an example, when a first message within the conversation is being displayed and the PIM client application begins displaying the second message, the message position indicator can reset. This can be based upon, for example, when the PIM client application begins displaying the beginning of the second message, either initially or when the beginning of the second message reaches approximately the mid-point window or other area of the display of the client device that is displaying the conversation. Thus, in an example, the message position indicator can also work in reverse such that if a user scrolls back up to a previous message, the message position indicator will now indicate a position within the previous message that the user has scrolled up to.

In an example, the technologies disclosed herein can be utilized with other applications other than PIM client/server applications. For example, the technologies disclosed herein can be used to display a position within displayed messages other than messages, e.g. to display a position within instant messages ("IM"), text messages, Short Message Service ("SMS") messages, Multimedia Messaging Service ("MMS") messages, messages that are posted on a social networking website, etc.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the technologies described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which can be referred to herein as a "FIG." or "FIGS.").

FIG. 1 is a computer system architecture diagram showing aspects of the configuration and operation of several components described herein for displaying an indicator of a position within a current message within a conversation.

As illustrated in FIG. 1, a PIM client application 108A may execute on a client device 104A. The client device 104A may be an appropriate computing device on which a PIM application may execute, such as a smart phone, a tablet computer, a personal digital assistant ("PDA"), a laptop or desktop computer, or any other appropriate type of computing device.

The PIM client application 108A may provide various PIM functionalities to a user 102A of the client device 104A. For example, the PIM client application 108A may enable the user 102A to view or compose messages, view a calendar, set up an appointment on the calendar, add or view tasks, add or view notes, and/or the like. For example, the PIM client application 108A provides various functionalities that are usually available in a typical PIM application.

In an example, the system architecture of FIG. 1 further includes a PIM server computer 112 running a PIM server application 114. The PIM server computer 112 may represent one or more server computers. For example, the PIM server computer 112 may include one or more processors and memory that stores various modules, applications, programs, or other data (e.g., PIM server application 114). For example, the memory in the PIM server computer 112 may include instructions that, when executed by the processors in the PIM server computer 112, cause the processors to perform one or more operations described herein. In an example, the memory of the PIM server computer 112 may store the PIM server application 114.

In an example, the PIM server application 114 can include a message parsing service 116. In an example, the message parsing service 116 monitors individual messages received by the PIM server computer 112 for the user account of the user 102A. For example, the message parsing service 116 can parse and analyze a message to identify one or more characteristics of the email. The message parsing service 116 can also receive one or more rules 118 that define the manner in which individual messages are to be parsed and analyzed. The rules 118, for example, can be defined by the user 102A, an administrator of the PIM server computer 114, another user 102B, and/or the like. Based upon the rules 118, the message parsing service 116 can parse messages to identify one or more characteristics associated with individual messages such as, for example, headers of the messages, fields of the messages (e.g., "To:"), certain strings of characters (e.g., a number of dashes), keywords, etc.

In an example, the client device 104A and the PIM server computer 112 are interconnected via a network 120. The network 120 may be a wireless or a wired network, or a combination thereof. The network 120 may be a collection of individual networks interconnected with each other and functioning as a single large network (e.g., the Internet or an intranet). Examples of such individual networks include, but are not limited to, telephone networks, cable networks, Local Area Networks ("LANs"), Wide Area Networks ("WANs"), and Metropolitan Area Networks ("MANs"). Further, the individual networks may be wireless networks, wired networks, or a combination thereof.

In an example, in addition to the client device 104A, the system architecture of FIG. 1 may also include one or more other client devices, e.g., client device 104B. The client device 104B may also execute a PIM client application 108B. The PIM client application 108B executing on the client device 104B may be accessed by a user 102B.

In an example, the PIM client application 108B may be at least in part similar to the PIM client application 108A. For example, the PIM client applications 108A and 108B may be provided by the same service provider, have one or more similar functionalities, etc. In another example, the PIM client application 108B may be different from the PIM client application 108A. For example, the PIM client applications 108A and 108B may be provided by different service providers, different developers, provide different functionality, etc.

In an example, the PIM client applications 108A, 108B can include a message parsing service 122A, 122B, respectively. In an example, the message parsing services 122A, 122B monitor individual messages received by the client device 104 for the user accounts of the users 102A, 102B, respectively. For example, the message parsing services 122A, 122B can parse and analyze a message to identify one or more characteristics of the message. The message parsing services 122A, 122B can also receive one or more rules 124 that define the manner in which individual messages are to be parsed and analyzed. The rules 124, for example, can be defined by the user 102A, an administrator of the PIM server computer 114, the user 102B, and/or the like. Based upon the rules 124, the message parsing services 122A, 122B can parse messages to identify one or more characteristics associated with individual messages such as, for example, headers of the messages, fields of the messages, etc.

In an example, the user 102A may be logged into the PIM client application 108A using a first user account. In an example, the PIM client application 108A may present an email creation user interface ("UI") 126A to the user 102A, in response to the user 102A requesting creation of a new message via the PIM client application 108A. The user 102A creates a message 128A. The user 102A sends the message 128A to the PIM server application 114 on the PIM server computer 112 via the PIM client application 108A. The PIM server application 114 forwards the message 128A to the desired recipient, for example, the user 102B. Other recipients (not illustrated) may also receive the message 128A.

The user 102B may be logged into the PIM client application 108B using a second user account and receives the message 128A. In an example, the PIM client application 108B may present a message creation UI 126B to the user 102B, in response to the user 102B requesting creation of a new message 128B via the PIM client application 108B in response to the message 128A. The user 102B creates a message 128B and sends the message 128B to the PIM server application 114 the PIM server computer 112 via the PIM client application 108B.

The PIM server application 114 forwards the message 128B to the desired recipient, for example, the user 102A. Other recipients not illustrated may also receive the message 128B. Thus, user 102A and user 102B have created a conversation made up of the two messages 128A and 128B. The conversation can continue to increase based upon the number of replies that the user 102A and/or the user 102B create and send. Other recipients (not illustrated) may also be replying to various messages 128 within the conversation and thus, the conversation may increase depending upon such replies.

The PIM server application 114 and PIM client application 108 can be any type of messaging application suitable for handling various aspects of messages as described herein. Additionally, the rules 118 and/or the rules 124 may or may not be used with the message parsing service 116 and/or the message parsing service 122. Additionally, the message parsing service 116 may be part of the PIM server application 114 and/or the message parsing service 122 may be part of the PIM client application 108.

Figure 2:
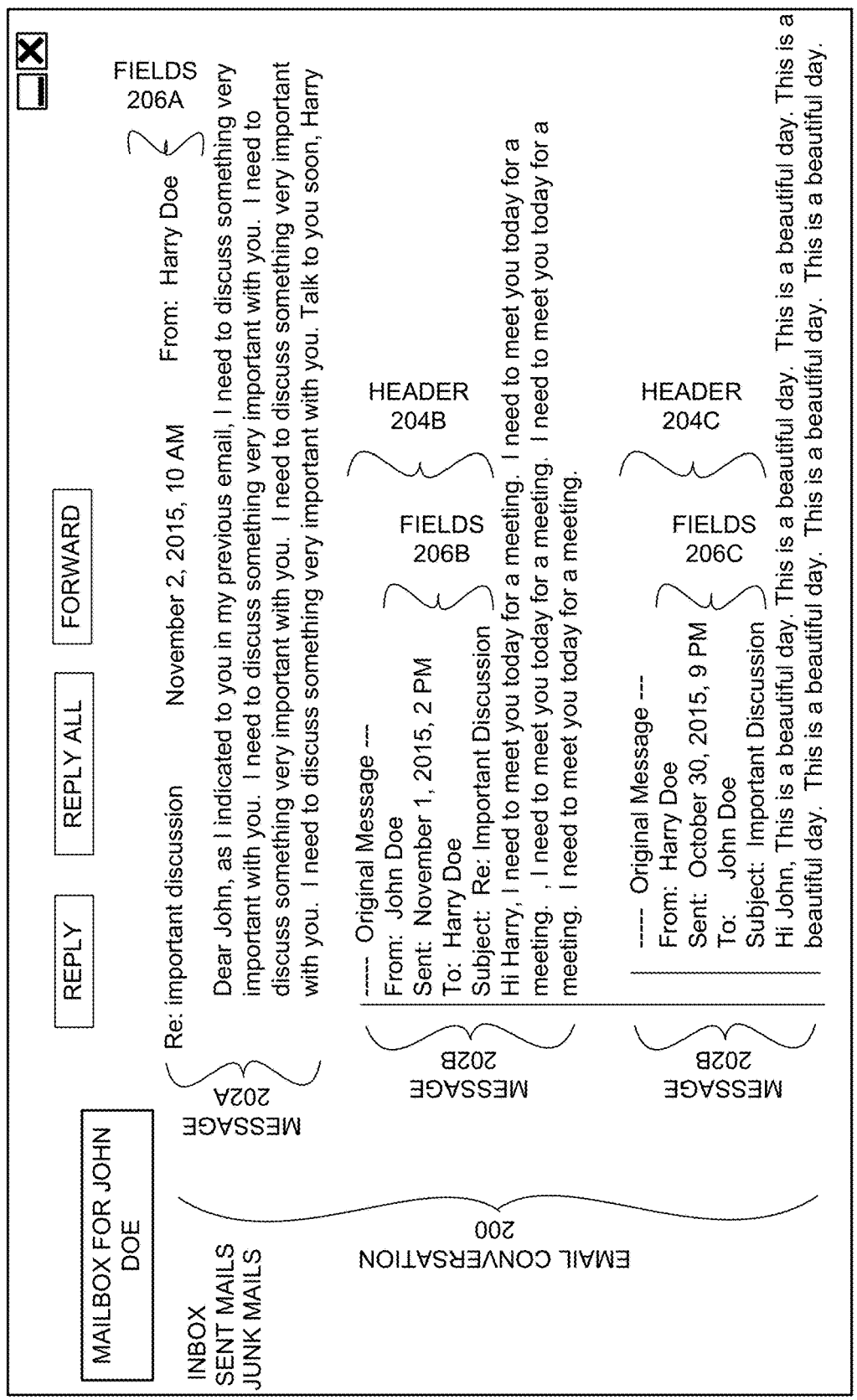
FIG. 2 is user interface diagram showing aspects of a message conversation being displayed on a display of a client device, according to one configuration.

FIG. 2 is a user interface diagram showing an example user interface for a conversation 200 being displayed on a display of a client device, for example one of client devices 104. As can be seen, the conversation 200 is made up of multiple messages 202 to form the conversation 200. As can also be seen, there are various headers that indicate the beginning of the messages 202. As can be seen, a header 204 indicates the beginning of a message 202 within the conversation 200 with, for example, —Original Message—. Additionally, the header 204 can include other headers or fields 206 that indicate who sent the message 202 (sender field), when the message 202 was sent, to whom the message 202 was sent (recipient field) and a subject of the message. The header 204 and fields 206 are merely examples and more or fewer headers and/or fields may be included.

Figure 3A:
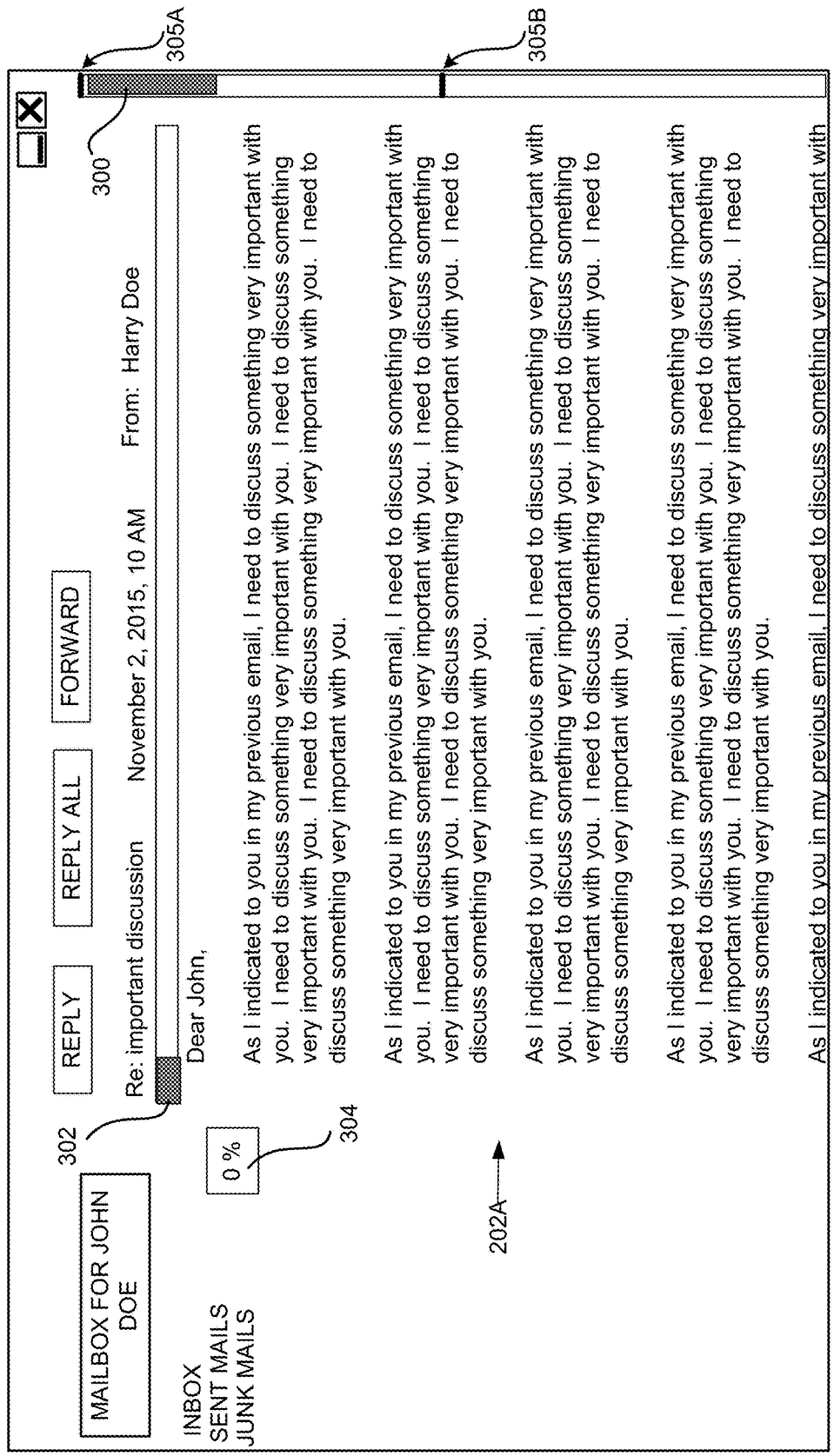
FIGS. 3A-3D are user interface diagrams showing aspects of a message conversation being displayed on a display of a client device where a message position indicator for messages within the conversation is included, according to one configuration.

FIG. 3A-3D illustrate a user interface diagram showing aspects of a user interface presenting messages 202A-C within a conversation being displayed within a window or other portion of a display of a client device. The message 202A comprises a large amount of text and is the most recent, i.e. newest, message in the conversation. Thus, it is the first message to be displayed in the conversation. As can be seen and as is known, on the right side of the message 202A is a vertical scroll bar 300. The scroll bar 300 generally indicates a position within an entire conversation that the user is currently observing. In FIG. 3A, the scroll bar 300 is at the beginning or top of the conversation. In an example, a message position indicator 302 is included along a top portion of the message that is currently being displayed. In the example illustrated in FIG. 3A, the message position indicator is a horizontal scroll bar.

In the example configuration shown in FIG. 3A, the scroll bar 300 also includes indicators 305A and 305B. The indicators 305A and 305B indicate the starting positions of messages in the conversation. For instance, in the example shown in FIG. 3A, the indicator 305A identifies the location of the start of the first message in the conversation and the indicator 305B identifies the location of the start of the second message in the conversation.

In some configurations, the indicators 305A and 305B can also be selected using an appropriate user input device in order to display the message corresponding to the selected indicator 305. For instance, in the example shown in FIG. 3A, the indicator 305B can be selected to display the start of the second message in the conversation. Likewise, the indicator 305A can be selected to display the start of the first message in the conversation. In this regard, it should be appreciated that although two indicators 305A and 305B have been illustrated in FIG. 3A, the number of indicators 305 presented in the scroll bar 300 can be equal to the number of messages in the conversation. For instance, if a conversation includes five messages, then five indicators 305 can be presented in the manner shown in FIG. 3A.

Figure 3B:
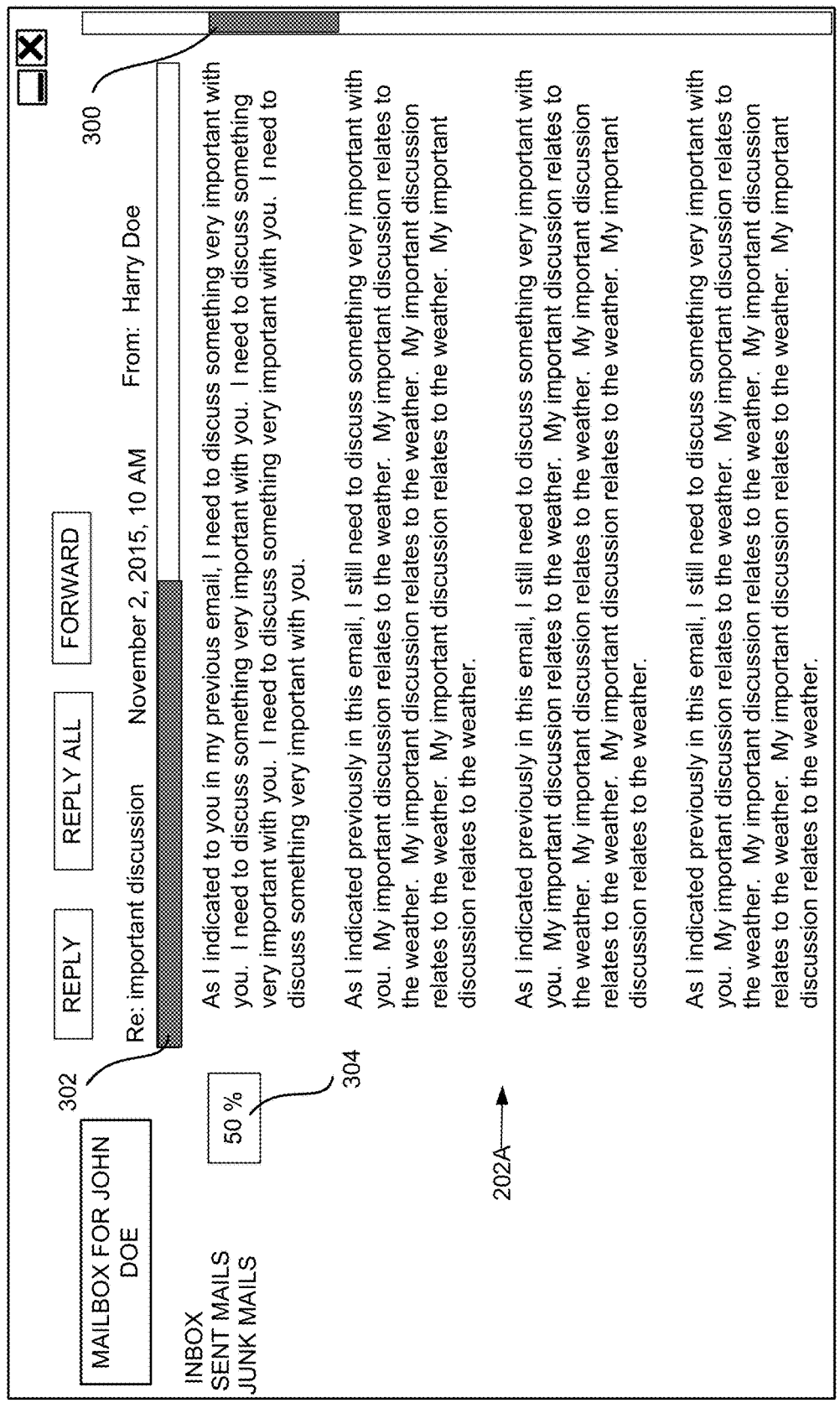

Referring to FIG. 3B, as the user scrolls down and reads the message 202A within the conversation, the scroll bar 300 correspondingly moves down to indicate an overall position within the conversation that includes the message 202A. Additionally, as the message 202A that is currently being displayed moves within the display area, the message position indicator 302 increases in length, as can be seen in FIG. 3B, to indicate the position within the message 202A.

Figure 3C:
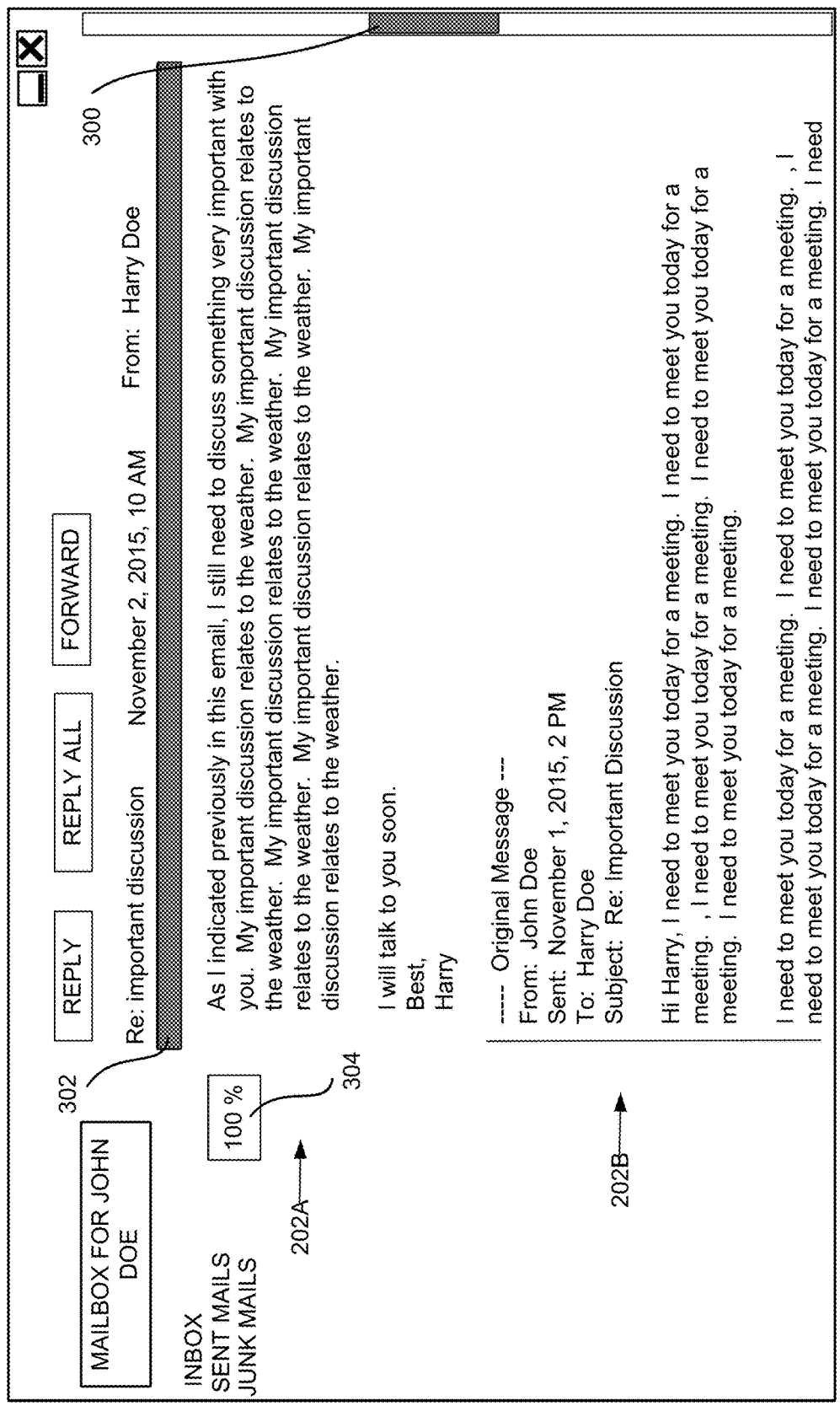

Thus, depending on the length of the conversation, i.e. the number and/or length of the individual messages within the conversation, the scroll bar 300 and the message position indicator 302 may or may not correspond with one another. For example, as can be seen in FIG. 3C, as the end of the message 202A is reached, the message position indicator 302 is fully extended. However, since the user is only about a half way into the conversation, the scroll bar 300 is only extended about half way.

Figure 3D:
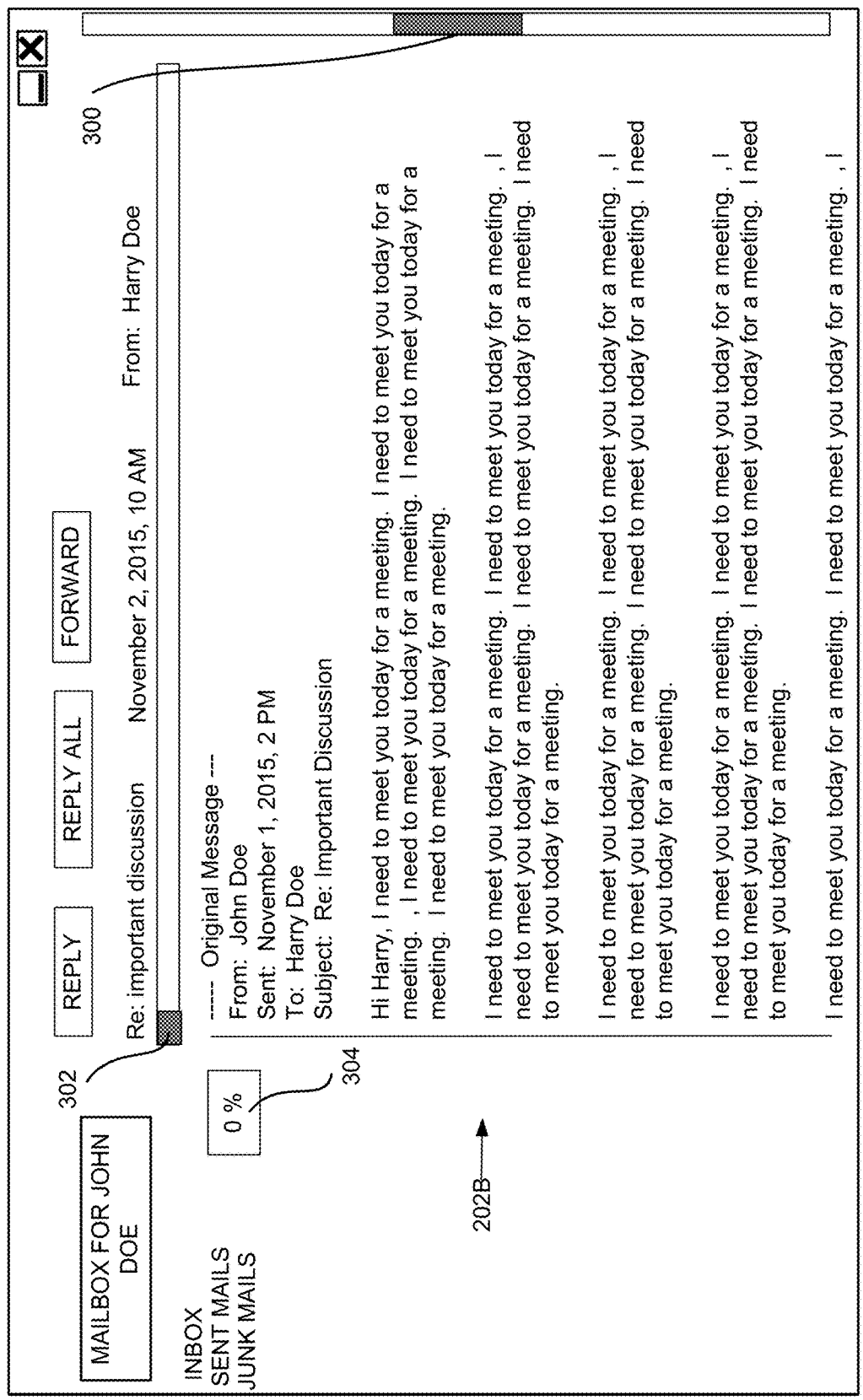

As the message 202A continues to move, as can be seen in FIG. 3D, once the second message 202B within the conversation is being displayed, the message position indicator 302 resets and now indicates a position within the second message 202B. In examples, the resetting of the message position indicator 302 can occur when the second message 202B first appears on the display of the client device, when the beginning of the new message 202B reaches the top of the window or other portion of the display displaying the conversation, the middle of the window or other portion of the display displaying the conversation, or any other position within the window or other portion of the display of the client device.

As an example, the position indicator 302 will also reset if the user scrolls back up to a previous message within the conversation. Furthermore, if the e-mail conversation includes multiple short messages that are simultaneously displayed on the display, the message position indicator 302 may not be displayed, i.e. inactive, or may be fully displayed, or listed as 100%.

In an example, the message position indicator 302 is a graphic user interface. In such an example, if a user interacts with a position on the position indicator 302 using an input such as mouse-type device, a touchpad, a keyboard, etc., the position of the message being displayed will move to correspond to the position on the message position indicator 302 with which the user interacted.

In other examples, the PIM client application 108 can also provide a UI that allows the user to go to the next message in a conversation and/or that allows that user to go the previous message in the conversation. Upon selecting the UI, the message position indicator 302 will reset according to the new message being displayed within the conversation While the examples illustrated in FIGS. 3A-3D show the message position indicator 302 extending horizontally and along a top portion of the window or other portion of the display displaying the messages 202A, 202B, the position message indicator 302 can be placed elsewhere such as, for example, along either vertical side of the window or other portion of the display displaying the messages 202A, 202B, along a bottom portion of the window or other portion of the display displaying the messages 202A, 202B, etc.

Additionally, the message indicator 302 may include (or simply consist of) a percentage indicator 304 that is displayed and indicates how far into the messages 202A, 202B a user viewing the messages 202A, 202B currently is. The percentage indicator 304 can be displayed in any position on the display of the client device as desired. In an example, the percentage indicator 304 can move with the message position indicator 302. In other examples, the color or shade of the message position indicator 302 can change as the position of the message changes. In addition, the color and/or shade of the background of the display may change as the position of the message changes.

In order to determine the size of the various messages and the position within various messages, e.g., messages 202A, 202B, of the conversation, the messages need to be parsed. The various headers and/or fields, e.g., header 204 and/or fields 206, previously discussed can be used to indicate the beginning of a new message. Additionally, the message parsing service 116 at the PIM server computer 114 or the parsing service 122 on the client device can place markers within the message to indicate the beginning and/or end of messages within the conversation. The markers can be placed in the headers and/or fields, for example. These markers can include, for example, an image with a small number of pixels (e.g., 2×2) that would be relatively imperceptible to the user. In addition, based upon spacing between the beginnings and/or endings of messages, a size of each message can be calculated or estimated.

Thus, the messages within the message conversation are parsed and sized such that at least a beginning for each message within the conversation is identified. Such parsing can be done either by the message parsing service 116 at the PIM server computer 114 or by the parsing service 122 on the client device. In an example, the message parsing service 122 performs the message parsing. This is due to the fact that if one or more of the messages within the conversation are not provided to the PIM server computer 114, but rather are provided by a different PIM server computer (not illustrated) directly to the client devices 104, then the client devices 104 need to parse the messages within the conversation in order to display the message position indicator 304.

The parsing can be performed based upon the rules 118 or the rules 124, depending upon which parsing service performs the parsing. The parsing allows the PIM client applications 108A, 108B to analyze the conversation and messages included therein to determine sizes and positions of the messages as described herein.

It should also be appreciated that while the technologies illustrated in FIGS. 1-3D and discussed above are directed to providing an indication as to a position within a message, e.g., messages 128A, 128B, of a conversation that is currently being displayed, i.e. read by a user, the technologies disclosed herein can also be used for other types of messages as well, e.g., instant messages, text messages, SMS messages, MMS messages, postings on a social networking website, and/or the like. For example, at least some of the messages 128A, 128B of FIGS. 1-3D can be replaced by IM, text messages, SMS, MMS, postings on a social networking website, or other types of messages.

Figure 4:
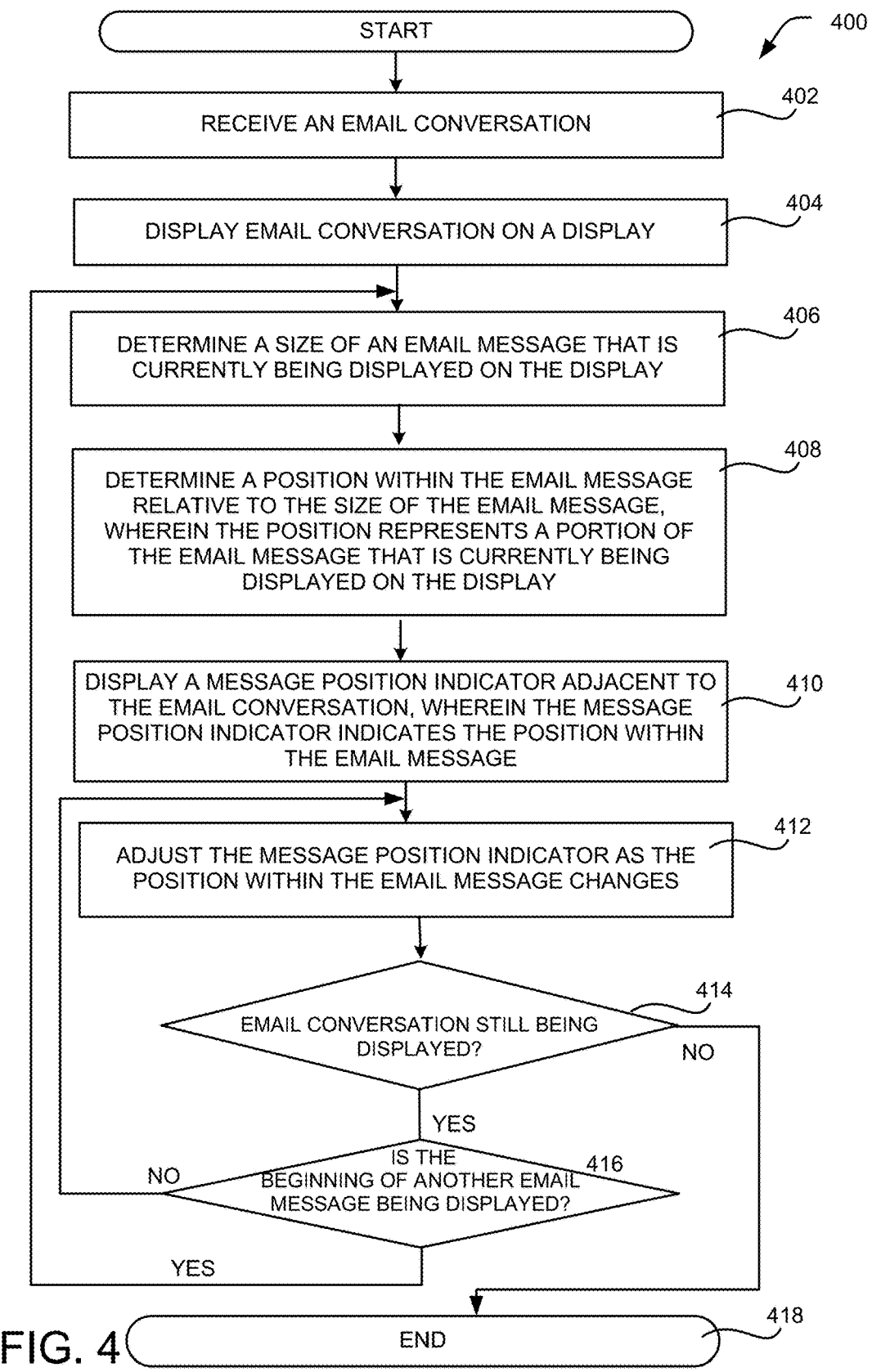
FIG. 4 is a flow diagram showing several routines that illustrate aspects of the operation of several mechanisms disclosed herein for providing an indication as to a position within a message that is currently being displayed within a conversation, according to one configuration.

FIG. 4 is a flow diagram showing a routine 400 that illustrates aspects of the operation of one mechanism disclosed herein for providing an indication as to a position within a message that is currently being displayed within a conversation, i.e. read by a user, according to one configuration disclosed herein. It should be appreciated that the logical operations described herein with respect to FIG. 4 can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in FIG. 4 and described herein. These operations can also be performed in parallel, or in a different order than those described herein.

The routine 400 begins at operation 402, where the PIM client application 108 on a client device 104 receives a conversation comprising multiple messages, e.g., conversation 200. The routine 400 then proceeds from operation 402 to 404, where the conversation is displayed on a display of a client device 104. At operation 406, a size of a message that is currently being displayed within the conversation is determined. Such a determination can be made by parsing the message, either at the client device 104 or at a PIM server computer such as PIM server computer 112.

The routine 400 then proceeds from operation 406 to 408, where a position within the message relative to the size of the message, wherein the position represents a portion of the message that is currently being displayed on the display. The position can be determined, for example, by the PIM client application 108.

At operation 410, a message position indicator is displayed adjacent to the conversation. The message position indicator indicates the position within the message and may be in the form of, for example, a horizontal scroll bar, a vertical scroll bar, a percentage indicator, or a combination thereof. The message position indicator is adjusted at operation 412 as the position within the message changes.

The routine 400 then proceeds from operation 412 to operation 414, where it is determined if the conversation is still being displayed. If no, then the routine 400 ends at operation 418. If yes, then the operation proceeds to operation 416, where the PIM client application 108 determines if the beginning of another message is being displayed. If so, the routine 400 proceeds to operation 406. If not, the routine 400 proceeds to operation 412.

It should be appreciated that while the configurations disclosed herein have been primarily presented in the context of messages, it should be appreciated that the technologies disclosed herein can also be utilized in other contexts. For example, and without limitation, the mechanisms disclosed herein can be utilized to indicate a location at which a user is reading within a chapter of a multiple chapter book, to indicate a location at which a user is reading within a section of a multiple section document, or to indicate a location at which a user is reading within a web page having multiple sections. The technologies disclosed herein can also be utilized in other contexts in other configurations.

Figure 5:
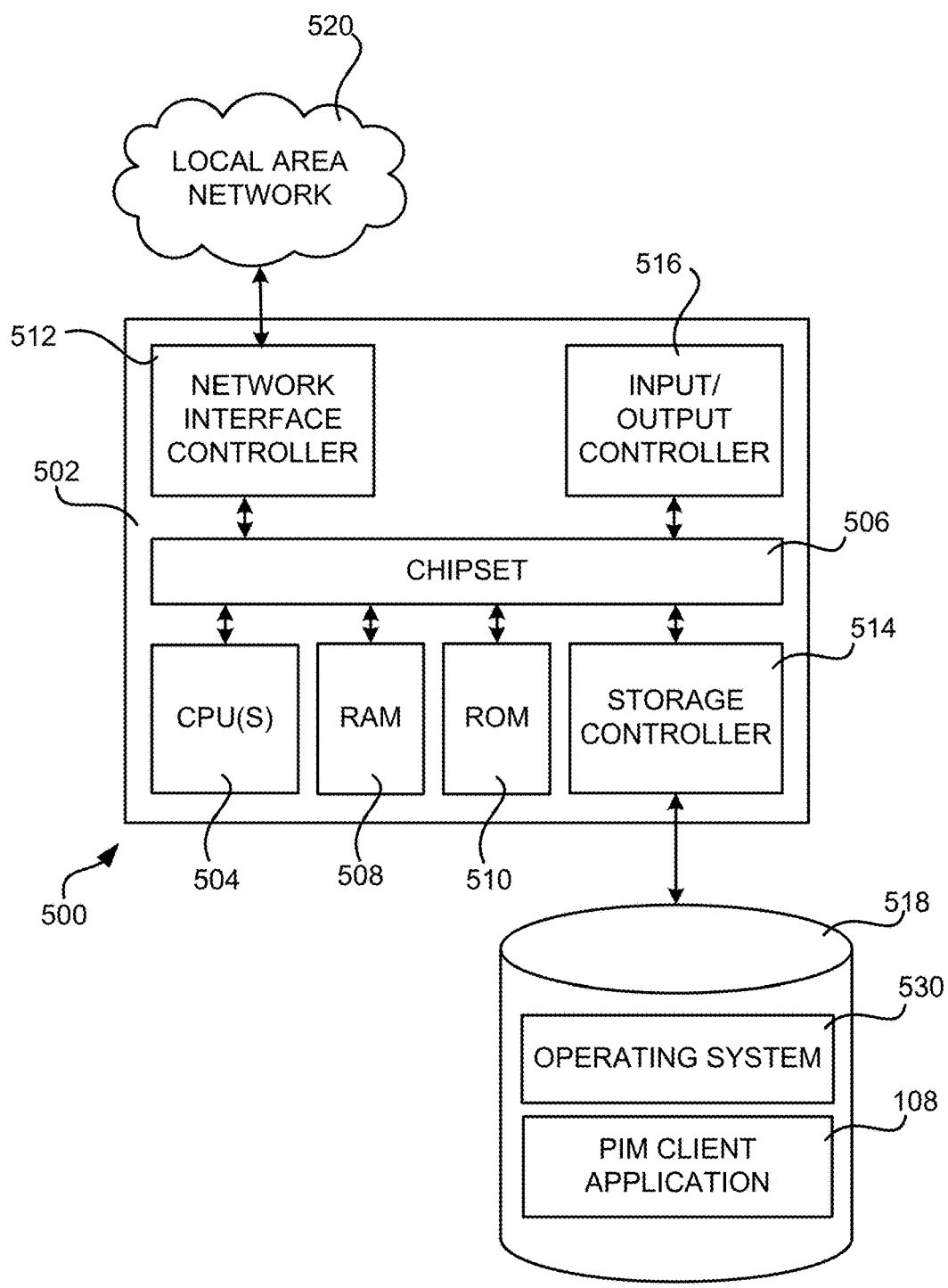
FIG. 5 shows an example computer architecture for a computer capable of executing the program components described herein for providing an indication as to a position within a message that is currently being displayed within a conversation.

FIG. 5 shows an example computer architecture for a computer 500 capable of executing the program components described above for providing an indication as to a position within a message that is currently being displayed within a conversation, i.e. read by a user. The computer architecture shown in FIG. 5 illustrates a conventional server computer, workstation, desktop computer, laptop, tablet, network appliance, personal digital assistant ("PDA"), e-reader, digital cellular phone, or other computing device, and can be utilized to execute any of the software components presented herein. For example, the computer architecture shown in FIG. 5 can be utilized to execute the PIM client application 108 described above on a client device 104 in the system architecture of FIG. 1.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the local area network 520. The chipset 506 can include functionality for providing network connectivity through a NIC 512, such as a gigabit Ethernet adapter. The NIC 512 is capable of connecting the computer 500 to other computing devices over the network 520. It should be appreciated that multiple NICs 512 can be present in the computer 500, connecting the computer to other types of networks and remote computer systems.

The computer 500 can be connected to a mass storage device 518 that provides non-volatile storage for the computer. The mass storage device 518 can store system programs, application programs, other program modules, and data, which have been described in greater detail herein. The mass storage device 518 can be connected to the computer 500 through a storage controller 514 connected to the chipset 506. The mass storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the mass storage device 518 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 518 is characterized as primary or secondary storage, and the like.

For example, the computer 500 can store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the mass storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. As used herein, the term computer-readable storage media does not encompass transitory signals per se.

The mass storage device 518 can store an operating system 530 utilized to control the operation of the computer 500. According to one configuration, the operating system comprises the LINUX operating system. According to another configuration, the operating system comprises the WINDOWS® SERVER operating system from MICROSOFT Corporation. According to further configurations, the operating system can comprise the UNIX operating system. It should be appreciated that other operating systems can also be utilized. The mass storage device 518 can store other system or application programs and data utilized by the computer 500, such as PIM client application 108 and/or any of the other software components and data described above. The mass storage device 518 might also store other programs and data not specifically identified herein.

In one configuration, the mass storage device 518 or other computer-readable storage media is encoded with computer-executable instructions which, when loaded into the computer 500, transform the computer into a computer capable of implementing the configurations described herein. These computer-executable instructions transform the computer 500 by specifying how the CPUs 504 transition between states, as described above. According to one configuration, the computer 500 has access to computer-readable storage media storing computer-executable instructions which, when executed by the computer 500, perform the various routines described above with regard to FIG. 4. The computer 500 might also include computer-readable storage media for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, the input/output controller 516 can provide output to a display, such as a computer monitor, a flat-panel display, a digital projector, a printer, a plotter, or other type of output device. It will be appreciated that the computer 500 might not include all of the components shown in FIG. 5, can include other components that are not explicitly shown in FIG. 5, or might utilize an architecture completely different than that shown in FIG. 5.

Based on the foregoing, it should be appreciated that technologies for providing an indication as to a position within a message of a conversation that is currently being displayed, i.e. read by a user, have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus comprising:
a processor; and
a non-transitory computer-readable storage medium having instructions stored thereon which are executable by the processor and which, when executed, cause the apparatus to:
receive an email conversation, wherein the email conversation comprises multiple email messages;
display at least a first email message of the email conversation on a display of the apparatus;
parse text of the first email message to determine one or more headers separating the multiple email messages;
determine, based at least in part upon the one or more headers separating the multiple email messages, a size of the first email message that is currently being displayed on the display;
determine a position within the first email message relative to the size of the first email message, wherein the position represents a portion of the first email message that is currently being displayed on the display;
display a horizontal scrollbar along a top portion of the email conversation, wherein the horizontal scrollbar indicates the position within the first email message;
determine that the position within the first email message has changed;
based at least in part on the position within the first email message having changed, adjust the horizontal scrollbar as the position within the first email message changes; and
reset the horizontal scrollbar when an initial portion of a second email message of the multiple email messages is moved across a vertical mid-point of a window displaying the first email message within the display, the second email message following the first email message in the multiple email messages.

2. The apparatus of claim 1, wherein the one or more headers comprise indications of beginnings of the multiple email messages.

3. The apparatus of claim 1, wherein the one or more headers comprise at least one of (i) a recipient field or (ii) a sender field.

4. The apparatus of claim 1, wherein the instructions further cause the apparatus to display a percentage indication of the first email message that has been displayed.

5. The apparatus of claim 1, wherein the instructions further cause the apparatus to determine the position within the first email message based at least in part upon parsed text of the first email message that is currently being displayed at a middle portion of a window displaying the first email message within the display.

6. The apparatus of claim 1, wherein the message position indicator further comprises at least one of (i) a horizontal scrollbar, (ii) a vertical scrollbar or (iii) a numerical display indicating a percentage.

7. The apparatus of claim 1, wherein the instructions further cause the apparatus to reset the horizontal scrollbar when a previously displayed email message of the multiple email messages is moved across a vertical mid-point of the window displaying the first email message within the display.

8. A non-transitory computer-readable storage medium having computer-executable instructions stored thereupon which, when executed by a computer, cause the computer to:
receive a conversation, wherein the conversation comprises multiple messages;
display at least a first message of the conversation on a display of the computer;
parse text of the first message;
determine, based at least in part upon parsed text of the first message, a size of the first message that is currently being displayed on the display;
determine a position within the first message relative to the size of the first message, wherein the position represents a portion of the first message that is currently being displayed on the display;
display a message position indicator comprising a horizontal scrollbar, wherein the message position indicator indicates the position within the first message;
determine that the position within the first message has changed;
based at least in part on the position within the first message having changed, adjust the message position indicator as the position within the first message changes; and
reset the indicator when an initial portion of a second message of the multiple messages is moved across a vertical mid-point of a window displaying the first message within the display, the second message following the first message in the multiple messages.

9. The non-transitory computer-readable storage medium of claim 8, wherein the message position indicator further comprises at least one of (i) a horizontal scrollbar, (ii) a vertical scrollbar or (iii) a numerical display indicating a percentage.

10. The non-transitory computer-readable storage medium of claim 8, wherein the size is determined based at least in part upon headers comprising indications of beginnings of the multiple messages, wherein the headers are determined based at least in part upon parsed text of the first message.

11. The non-transitory computer-readable storage medium of claim 8, wherein the size is determined based at least in part upon headers comprising at least one of (i) a recipient field or (ii) a sender field.

12. The non-transitory computer-readable storage medium of claim 8, wherein the instructions further cause the computer to display a percentage indication of a portion of the first message that has been displayed.

13. The non-transitory computer-readable storage medium of claim 8, wherein the instructions further cause the computer to determine the position within the first message based at least in part upon parsed text of the first message that is currently being displayed at a middle portion of a window displaying the first message within the display.

14. The non-transitory computer-readable storage medium of claim 8, wherein the instructions further cause the computer to reset the indicator when a previously displayed message of the multiple messages is moved across a vertical mid-point of the window displaying the first message within the display.

15. A computer-implemented method, comprising:
receiving a conversation, wherein the conversation comprises multiple messages;
displaying at least a first message of the conversation on a display;
parsing text of the first message;
determining, based at least in part upon parsed text of the first message, a size of the first message that is currently being displayed on the display;
determining a position within the first message relative to the size of the first message, wherein the position represents a portion of the first message that is currently being displayed on the display;
displaying a graphic user interface comprising a horizontal scrollbar, wherein the graphic user interface indicates the position within the first message;
determining that the position within the first message has changed;
based at least in part on the position within the first message having changed, adjusting the graphic user interface as the position within the first message changes; and
resetting the graphic user interface when an initial portion of a second message of the multiple messages is moved across a vertical mid-point of a window displaying the first message within the display, the second message following the first message in the multiple messages.

16. The computer-implemented method of claim 15, further comprising displaying a percentage indication of a portion of the first message that has been displayed.

17. The computer-implemented method of claim 15, wherein determining the position within the first message comprises determining the position within the first message based at least in part upon parsed text of the first message that is currently being displayed at a middle portion of a window displaying the first message within the display.

18. The computer-implemented method of claim 15, wherein the message position indicator further comprises at least one of (i) a horizontal scrollbar, (ii) a vertical scrollbar or (iii) a numerical display indicating a percentage.

19. The computer-implemented method of claim 15, wherein the size is determined based at least in part upon headers comprising at least one of (i) a recipient field or (ii) a sender field.

20. The computer-implemented method of claim 15, further comprising resetting the graphic user interface when a previously displayed message of the multiple messages is moved across a vertical mid-point of the window displaying the first message within the display.

* * * * *